July 26, 1927.

G. E. COLLINS 1,636,852

BRAKE OPERATING MEANS

Filed Oct. 28, 1926

Inventor

Guy E. Collins

By H.L.&C.L. Reynolds
Attorneys

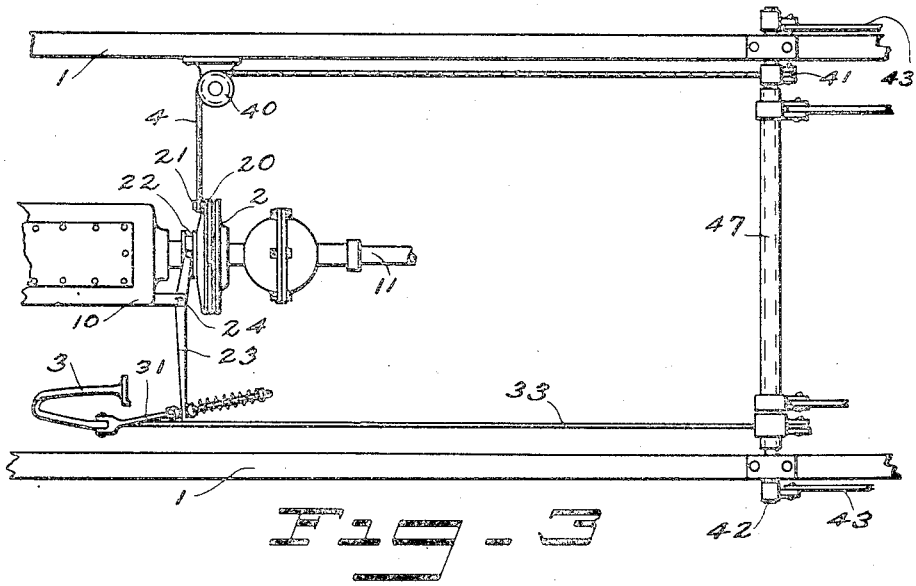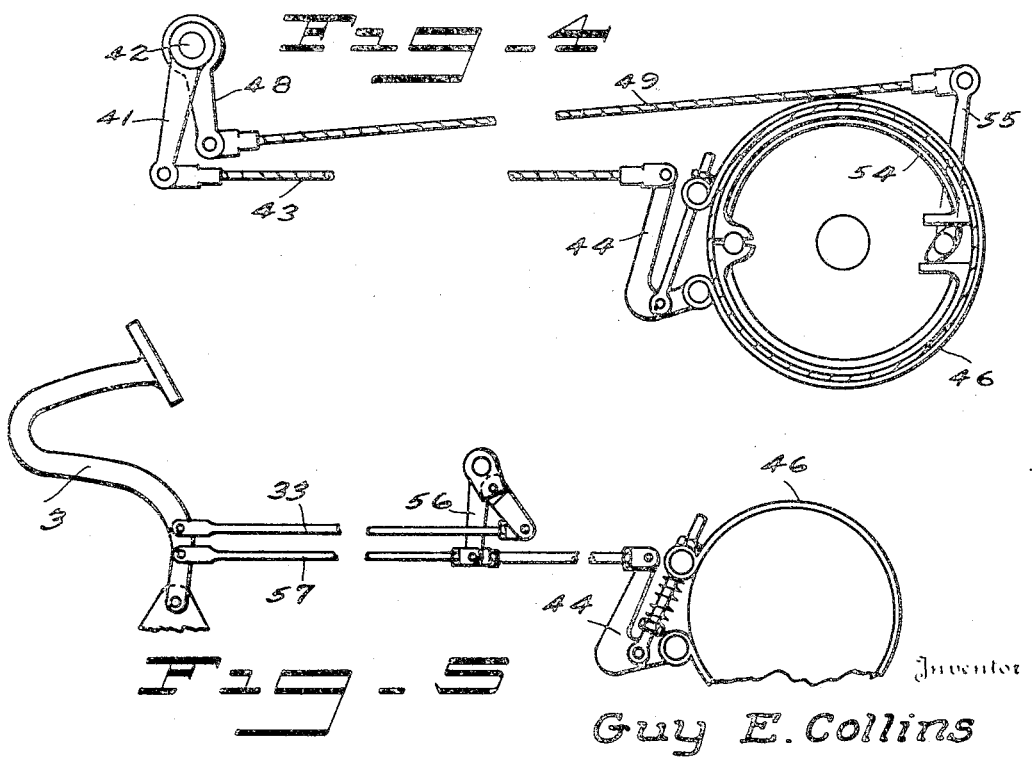

Patented July 26, 1927.

1,636,852

UNITED STATES PATENT OFFICE.

GUY E. COLLINS, OF SEATTLE, WASHINGTON, ASSIGNOR TO CHARLES W. COLLINS, OF SEATTLE, WASHINGTON.

BRAKE-OPERATING MEANS.

Application filed October 28, 1926. Serial No. 144,680.

My invention relates to means for operating brakes upon automobiles and comprises means whereby a single brake operating or controlling lever may be used to control the same brakes through two separate connecting means or to operate two different brakes, successively or selectively. It also relates to means whereby one of said brake operating means is actuated through means obtaining its power from a moving part of the automobile.

One object of my invention is to provide a more effective brake operating mechanism, and particularly one wherein two separate brake transmission mechanisms may be connected with one operating lever, either to operate successively upon the same brakes, or each connected with its respective brake and so as to operate one in advance of the other.

Another object of my inventin is to provide means, incorporated in one of said transmission mechanisms, whereby the actual application of the brake is done by power taken from a moving part of the automobile. My invention relates to the means for operating the brakes and not to the brakes per se. Other objects will be seen by a study of the following description and the accompanying drawings.

My invention consists in the novel arrangement and combination of parts whereby the above results are secured. I will first describe my invention as exemplified in the accompanying drawings and will then particularly define it by the claims which terminate this description.

Figure 3 is a view like that of Figure 1, except that two separate brakes are operated by separate transmission mechanisms from the same lever.

Figure 4 is a side view of means which may be employed to operatively connect such mechanism as is shown in Figure 3, with two separate brake bands.

Figure 5 illustrates a mechanism which may be employed whereby two separate sets of transmission members may be used to connect one lever with one set of brake bands.

Figure 1:
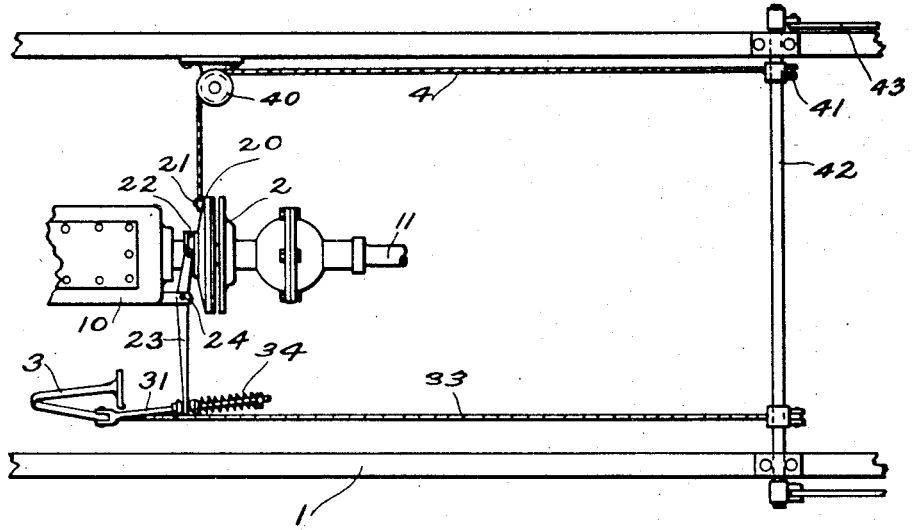
Figure 1 is a plan view of a portion of an automobile chassis, having thereon two transmission mechanisms extending from the brake lever to the same brake.

1 represents the chassis side bars, 10 a portion of the engine casing, and 11 the power transmission shaft. Secured to turn with the said transmission shaft is a disk 2. A complemental friction or clutch disk 20 is mounted to turn about the same axis as the disk 2, but so as to be unaffected by the rotation of disk 2, except through frictional contact between their faces. Disk 20 has a grooved hub 22, and a lever 23, pivoted at 24, engages with said groove to axially shift disk 20 and hold it in contact with disk 2 when desired. Normally they are not in contact.

Disk 20 carries an eccentrically mounted pin 21, which functions analogous to a crank pin. A transmission member 4, shown as a cable, is secured to pin 21, passes over a guide pulley 40 and thence to a lever 41 fixed upon a transverse shaft 42, which shaft is connected with and to actuate the brake in any approved manner. As illustrated, rods 43 extend from levers 41 to the lever, such as 44 of Figures 2, 4 and 5, which are directly connected with the brake band 46.

Figure 2:
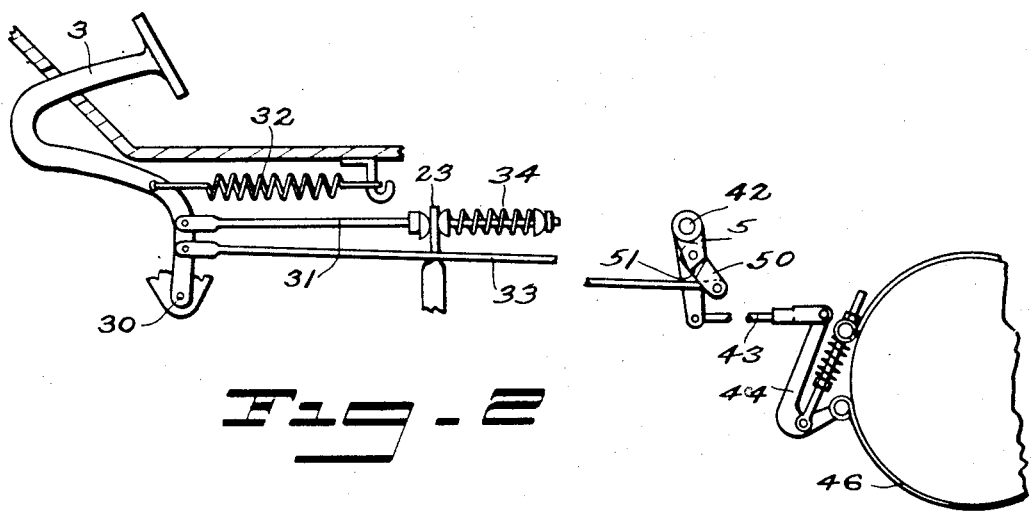
Figure 2 is a side view of one of the brake operating mechanisms.

In Figures 1 and 2, I have shown a second transmission line between the brake lever 3 and the shaft 42. This consists of a rod or cable 33 directly connecting brake lever 3 with a lever carried by shaft 42. This connection I prefer to make so that it is not brought into action until after the brakes have been set by the other means, that is through the use of cable 4. This result I have shown as secured by using a compound or jointed arm which is not brought into operative relation until sufficient movement has occurred to operate the brakes through the other transmission members. The chief purpose of this second connection is to provide a safety connection which may be brought into use should the other break or fail to function.

The compound lever illustrated has a section 5 which is fixed to the shaft 42 and a section 50 pivoted upon section 5, the two sections having shoulders 51 which are normally not in engagement but which are brought into engagement should the first set of transmission members, of which cable 4 is a part, fail to function.

By providing a yielding member at some point in that transmission line between brake lever 3 and the brake which is the first to be brought into action, the second line may be brought into action without any break occurring in the first line. To this end I employ a spring 34 mounted upon an extension of rod 31. This is designed to be of sufficient strength to be little or not at all compressed by a normal application of the power operated brake. Such movement is sufficient to take up the slack in the second line and further compression of the spring, due to continued movement of the brake lever, will apply the brakes through this second line. This is useful when a standing brake action is desired, and also when, for any reason, the power mechanism may fail to work. This spring performs another useful function in providing a yielding member between the brake lever 3 and the friction clutch 2, 20, to thereby prevent too severe application of this clutch.

In Figures 3 and 4, I have shown what is essentially the same operating mechanism connected so as to successively act upon two different brakes. The operating and transmission mechanisms are the same back to the transverse shaft 42. The same shaft 42 is used for operating the service brake, but a sleeve 47 is journaled upon shaft 42 and carries arms 48 which connect through rods 49 with the brake operating levers 55, which in turn set the emergency brakes 54. The brake mechanism proper may be of any approved design.

In this type of the device, a double connection from a single brake lever is used to operate two different brakes. In the type of device shown in Figure 5, a double connection, both manually operative, are shown connecting the brake lever, with the same brake. This is much like the construction shown in Figure 2, if the rod 31 of Figure 2 were connected with a rigid crank arm, such as arm 56 of Figure 5. Rod 57 of Figure 5 corresponds with rod 31 of Figure 2.

In this construction, rod 57 is the transmission member normally used. Should, however, a break occur in this, the other mechanism is brought into action.

What I claim as my invention is:

1. In a brake operating mechanism for automobiles, a brake operating lever, two sets of brake actuating members connected with and extending from said brake lever, one of said sets of brake actuating members containing a lever arm composed of two pivoted members having limit stops making a delayed engagement whereby to delay the actuation of the brake until after the other set has been brought into action.

2. A brake operating mechanism for automobiles, comprising an operating lever, two sets of brake actuating transmission members connecting with said lever one set containing a lever pivoted to freely swing, and a stop engaged by said lever after a preliminary swing to thereby operate the brake, whereby one set of said transmission members are brought into effective use in advance of the other.

Signed at Seattle, Washington, this 21st day of October, 1926.

GUY E. COLLINS.